April 7, 1953 J. L. SOLOMON 2,634,396
VOLTAGE COMPENSATOR FOR THREE
PHASE TO SINGLE PHASE SYSTEMS
Filed Dec. 23, 1949 2 SHEETS—SHEET 1

Inventor.
Julius L. Solomon,
By Wilkinson Huxley Byron & Hume
Attys.

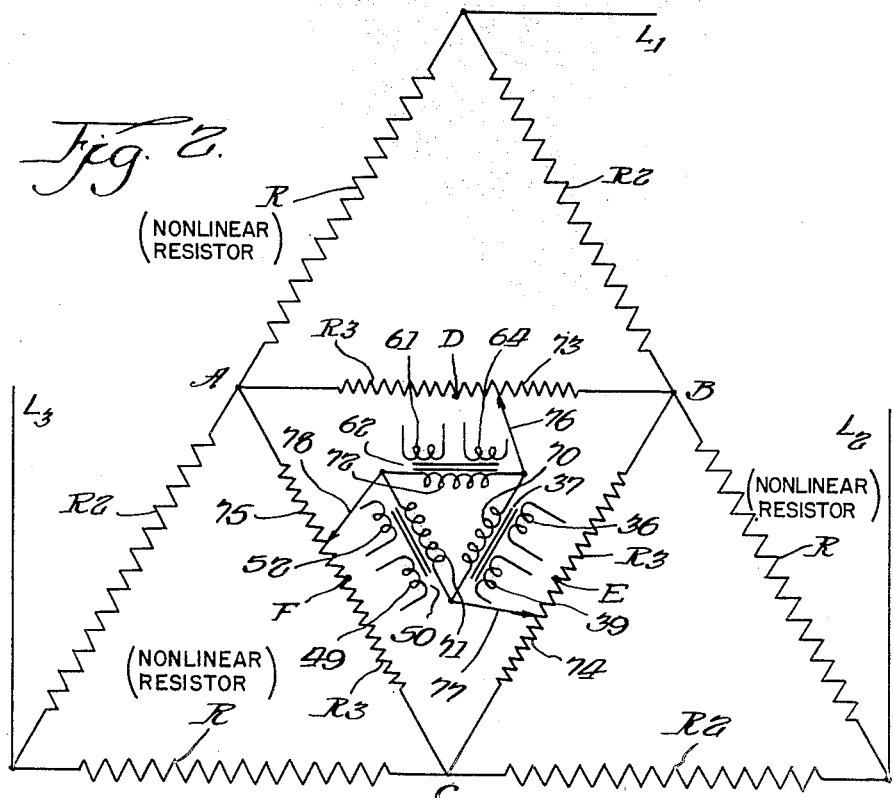
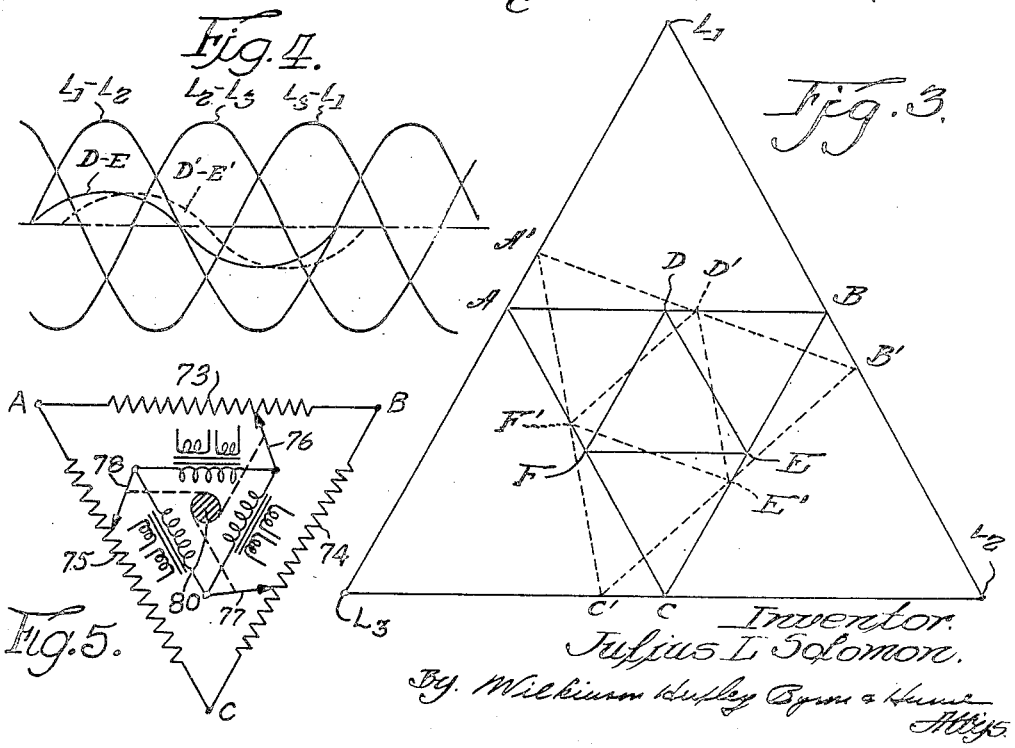

Patented Apr. 7, 1953

2,634,396

UNITED STATES PATENT OFFICE 2,634,396

VOLTAGE COMPENSATOR FOR THREE PHASE TO SINGLE PHASE SYSTEMS

Julius L. Solomon, Chicago, Ill., assignor to Welding Research, Inc., Chicago, Ill., a corporation of Illinois Application December 23, 1949, Serial No. 134,659

6 Claims. (Cl. 323—18)

1

The invention relates to control circuit means for a welding system of the three phase-three winding type and has reference in particular to an improved phase shifting circuit which will automatically compensate for voltage variations in the alternating current source to maintain a constant welding current for any particular heat setting.

The Sciaky Patent No. 2,431,083, granted November 18, 1947, discloses and claims an electric translating system for transferring energy from a polyphase alternating source to a load circuit such as a welding circuit, and where any one of three types of power may be secured in the welding circuit such as a single impulse of uni-directional current, a series of such uni-directional current impulses of the same polarity, or a series of current impulses, each impulse being opposite in polarity to the one immediately preceding it, and so comprising a form of single phase alternating current. More particularly the three phase-three winding system of the patent employs reactance means in the form of primary windings in inductive relation with a secondary load circuit and wherein each primary winding has individual circuit connections to its respective phase of the polyphase source of supply with electric discharge valves of the ignitron type being provided for controlling the rectified current supplied to the windings respectively.

For firing the ignitron tubes in a three winding system as herein described, electronic control circuits are employed such as shown and described in my Patent No. 2,600,519, dated June 17, 1952, entitled Sequence Control Circuit and Timer and Patent No. 2,623,204, dated December 23, 1952, entitled Control Circuit for Three-Phase Welders. The control circuits of said applications operate to render the ignitrons conductive as groups in an alternate manner to pass current to the primary windings for preset intervals with controllable periods of off-time between each energization. In one of said control circuits the several pairs of ignitrons are inductively connected so that the action of one ignitron of a group in being rendered conductive or non-conductive will result in similar action as regards the other ignitrons of that group. In connection with such structure a phase shifting device is provided whereby the voltage for firing the ignitrons can be phase shifted with respect to the voltage appearing across the particular phase to which the ignitrons are electrically connected.

It is an object of the present invention to provide automatic phase shifting means for three-phase welding systems as described whereby to compensate for variations in the line voltage so as to maintain the welding current substantially constant for any particular setting.

Another object of the invention is to provide an improved phase shifting device employing a pair of resistors for each phase and which will have certain resistance characteristics such that the ratio of one resistor to the other will change upon an increase or a decrease of the respective voltage in the three-phase alternating current source, the said change in the resistance ratio being employed to vary the phase relation of the voltages firing the ignitrons with respect to the line voltages, thus automatically maintaining a substantially constant welding current.

A further object of the invention resides in the provision of a phase shifting device wherein a pair of resistors for each phase of the alternating current source is connected in delta relation, the said resistors being operative to shift the firing of the ignitrons either earlier or later in the particular half cycle to compensate for voltage variations in the line, and wherein the speed of the voltage compensation can be preselected by choosing resistors having the proper characteristics.

A further object of the invention resides in the provision of a phase shift device of the automatic type and which can be initially calibrated to secure the desired rate of voltage compensation by electrically connecting resistors for each pair wherein one will have a high thermal lag if a slow rate of compensation is desired and wherein one will have a low thermal lag if rapid compensation is desired.

With these and various other objects in view, the invention may consist of certain novel features of construction and operation as will be more fully described and particularly pointed out in the specification, drawings and claims appended hereto.

In the drawings which illustrate an embodiment of the invention, and wherein like reference characters are used to designate like parts—

Figure 2 is a schematic diagram illustrating the phase shifting device of the invention;

Figure 3 is a vector diagram illustrating by voltage vectors the phase relationship existing across the several phases of the alternating current source;

Figure 4 is a diagrammatic illustration of the alternating voltages in a conventional three-phase source showing the delayed firing obtained by the present phase shifting device; and Figure 5 is a fragmentary schematic view illustrating a common shaft for actuating the sliders of the potentiometers for the phase shift device.

Figure 1:
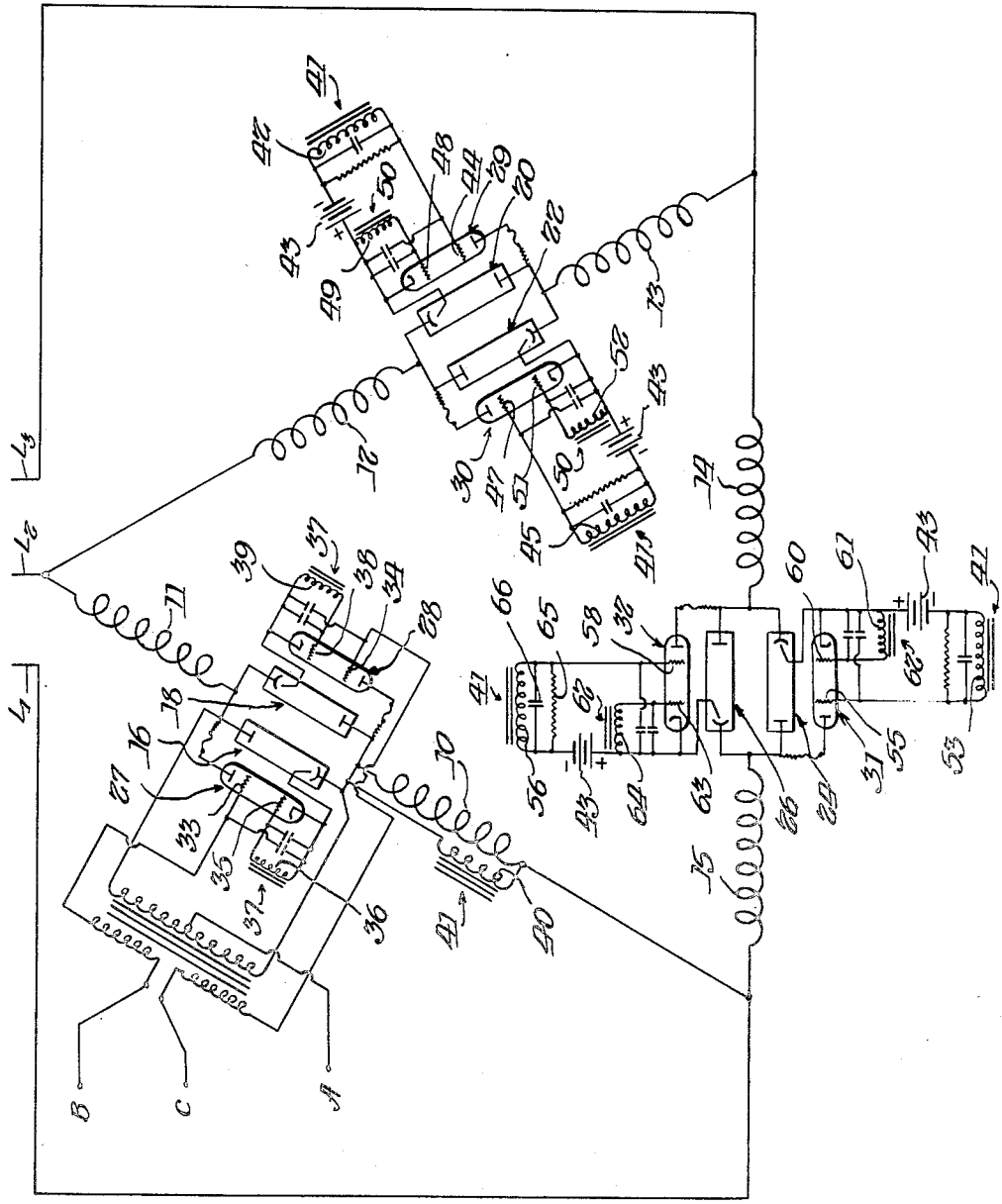
Figure 1 is a wiring diagram of the primary circuit of a three phase-three winding welding transformer representative of the systems to which the present invention is applicable, the said diagram illustrating the electronic elements and circuit connections for controlling the firing of the ignitrons.

As disclosed in Figure 1, the primary circuit of the three-phase welding transformer has three primary windings indicated by numerals 10—11, 12—13 and 14—15, with each winding being individually connected to a phase of the three-phase source of supply. The leads $L_1$, $L_2$ and $L_3$ represent the conductors of the three-phase source and it will be seen that primary winding 10—11 has connection to conductors $L_1$—$L_2$, with winding 12—13 having connection to conductors $L_2$ and $L_3$, and winding 14—15 having connection to conductors $L_3$ and $L_1$. Each primary winding may comprise a number of windings connected in series and for illustrative purposes two such windings have been shown with a winding on each side of a pair of inversely connected ignitrons having control means electrically connecting therewith for controlling the flow of current through its respective primary winding. The secondary or load circuit of the present transformer structure is not shown although it will be understood that the secondary winding may consist of a relatively heavy copper section of several turns having inductive relation with the primary windings.

The control means for the various windings performs a controlling function so that a positive or negative half cycle of alternating current is supplied to the windings in sequence according to the phase relation of the electromotive forces in the three phase supply line. For example, one of the ignitrons controlling the flow of current in primary winding 10—11 is rendered conductive so that a half cycle of current from phase $L_1$ and $L_2$ is supplied to said winding. Before the magnetizing effect of the flow of this current through the winding dies out the phase relation of the electromotive forces in the three-phase supply is such that a half cycle of current from phase $L_2$—$L_3$ is supplied to primary winding 12—13, one of the ignitrons controlling this winding having been rendered conductive in sequence for the purpose. Likewise one of the ignitrons for winding 14—15 is conductive and a half cycle of current from phase $L_3$—$L_1$ will flow through this winding in order. Operation of the control means can be continued in this manner so that magnetizing current impulses flow through the primary windings in the same direction until the rise in the magnetic flux reaches a predetermined maximum, at which time the group of three ignitrons are rendered non-conductive. The rise in the magnetic flux has the effect of inducing a unidirectional current in the secondary or load circuit and which is a pulsating current of increasing magnitude. In order for the magnetic flux to rise in a steady manner the current flow through the windings must be controlled by the ignitrons which rectify the currents of the respective phases so that they have a unidirectional flow. Thus each magnetizing current pulse will flow through its primary winding in a direction to augment the magnetic flux and one impulse of unidirectional current is induced in the load circuit, the same comprising the combined output of the phases of the polyphase supply for that particular energization.

Figure 1 shows one form of control means designed to regulate the firing of the various ignitrons and to maintain them conductive for the desired magnetizing period. It is required that the control means render sets or groups of ignitrons alternately conductive so that the direction of current flow through the windings can be reversed for each energization to generate a low frequency alternating current in the secondary or load circuit. A timer electrically connecting with the terminals A, B and C controls the conductivity of the ignitrons 16 and 18 of the primary winding 10—11 in a predetermined manner and inductively related circuits are provided for ignitrons 20—22 of primary winding 12—13 and for ignitrons 24—26 of primary winding 14—15 so that their conduction follows that of the lead ignitron and they accordingly fire in sequence as determined by the phase relation of the electromotive forces in the supply line. The ignitrons of each pair are connected in anti-parallel relation with each other and in series relation with their particular primary winding, with each ignitron including an anode, a mercury cathode, and a control electrode as well understood in the art. A firing valve, which may comprise a thyratron, is provided for each ignitron, the same being indicated by numerals 27, 28, 29, 30, 31 and 32. Thyratrons 27, 28 for the ignitrons 16—'8 respectively have electrical connection with the control points A, B and C. Point A constitutes a common cathode point and is electrically connected with the cathodes of the thyratrons 27 and 28. Point B electrically connects with the screen grid 33 of thyratron 27 and in a similar manner point C electrically connects with the screen grid 34 of thyratron 28. The control grid 35 of thyratron 27 is connected to the secondary winding 36 of a transformer 37, the primary of this transformer having location in the phase shift control device of the invention shown in Figure 2 and which will be presently described in detail. In a similar manner control grid 38 of thyratron 28 is electrically connected with the secondary winding 39 of transformer 37. For maintaining ignitrons 16 and 18 in a non-conductive state the terminals B and C are maintained negative with respect to terminal A. The action of the electric valves is to pass current only when their anodes are positive. When it is desired to fire ignitron 16 terminal B is made positive by the action of the timer and the potential on terminal C is maintained negative. Although terminal B and thus screen grid 33 of thyratron 27 is now positive with respect to its cathode, said tube will not fire until its control grid 35 is likewise made positive. By reason of the secondary windings 36 and 39 of transformer 37 an alternating current voltage will exist in the control grid circuit of the thyratrons. As regards grid 35 the same will be made positive with respect to its cathode at a certain time in the half cycle for this particular phase as determined by the phase shift control device. Eventually through the joint action of the voltages on the screen grid 33 and control grid 35 thyratron 27 will fire, rendering ignitron 16 conductive for passing a half cycle of current or a portion thereof which will flow from $L_2$ to $L_1$ through primary winding 10—11. It will be understood that ignitrons 16, 20 and 24 constitute one group for passing current through their respective primary windings in one direction, whereas ignitrons 18, 22 and 26 constitute the second group for passing current through their respective windings in an opposite direction.

The flow of current through primary winding 10—11 as above described will develop a direct current voltage across winding 40 constituting the primary winding of a transformer 41, the said primary winding 40 being connected in parallel with primary winding 10 of the welding transformer. Transformer 41 has a plurality of secondary windings located in control circuits associated with primary windings 12—13 and 14—15 and which control circuits are energized in a manner as will now be described to cause a firing of one ignitron of the pair as a result of flow of current through the lead ignitrons 16 or 18.

The screen grid circuit of thyratron 29 includes the secondary winding 42 of transformer 41 and a source of direct current potential such as the storage battery 43. The battery is connected as shown with its positive side toward the cathode of thyratron 29 so that the negative side of the battery has electrical connection with screen grid 44. The screen grid circuit of thyratron 30 likewise includes a secondary winding 45 of transformer 41 and a source of direct current potential in the form of a storage battery 43 connected with its positive side toward the cathode of ignitron 30 with its negative side in electrical connection with screen grid 47. The control grid 48 of thyratron 29 is electrically connected with the secondary winding 49 which forms the control grid circuit of this thyratron. In a similar manner the control grid 51 of thyratron 30 is electrically connected to the secondary winding 52 which constitutes the control grid circuit of this thyratron. The secondaries 49 and 52 have a common primary, the structure constituting transformer 50 similar in all respects to transformer 37 and having location in the phase shift control device of the present invention, as will be clear from an inspection of Figure 2.

The thyratrons 31 and 32 for the ignitrons 24 and 26 have electrical connection with similar screen grid and control grid circuits and it is not believed necessary to describe this duplicated structure. However, should further description be deemed necessary reference is made to applicant's Patent No. 2,623,204, previously identified. It is sufficient to point out that secondaries 53 and 56 of the common transformer 41 are connected in the screen grid circuit of the thyratrons and that secondaries 61 and 64 of the phase shift transformer 62 are connected in the control grid circuit of said thyratrons.

It has been explained that flow of current through primary winding 10—11 will develop a direct current voltage across the primary 40 of transformer 41. A direct current voltage will also be developed across secondaries 42, 45, 53 and 56 of said transformer 40. Considering the direction of flow of current through primary winding 10—11, it will be seen that this direct current voltage will have a polarity in secondaries 42 and 53 which will be opposite to that of battery 43. However, in secondaries 45 and 56 the polarity of this direct current voltage is such as to supplement the battery 43 so that the control grids are held negative. The opposing or counter voltage in secondaries 42 and 53 is such as to render the screen grid of the thyratrons 29 and 31 positive so that the thyratrons will fire at a time in the half cycle of their respective phase as determined by the control grids 48 and 60.

Said grids are under the control of the phase shift control device of the invention. The phase relation of the electromotive forces in the three-phase supply line is such that a half cycle of current or portion thereof is caused to flow through primary winding 12—13, this half cycle being of the same polarity but displaced 120 degrees with respect to that flowing through primary winding 10—11. However, flow of this half cycle through winding 12—13 may be delayed by the setting of the phase control device since thyratron 29 will fire under these conditions, provided the potential on both its screen grid and its control grid are positive. When this takes place thyratron 29 becomes conductive, firing the ignitron 20 to pass the pulse of current which accordingly flows from $L_1$ to $L_2$.

The next half cycle of current or portion thereof is caused to flow through the primary winding 14—15, said pulse being passed by ignitron 24 when the joint action of the voltages on the screen grid 55 and control grid 60 of thyratron 31 is such as to cause the thyratron to fire. Successive pulses of current will flow through the windings according to the respective phases so that a unidirectional current will flow through each winding and all will be of the same polarity. Such operation will continue as long as the timer maintains a positive potential on point B. At the end of a preset interval of time the timer will bring point B to a negative potential and this terminates the energization. The control circuit remains in a quiescent state and which may constitute the off-time between successive energizations of the primary windings of the welding transformer.

For the next energization of the primary windings the potential on point C is made positive with B being maintained negative. Ignitron 18 now becomes the lead ignitron since the same will pass a pulse of current from $L_1$ to $L_2$ in proper phase order when the screen grid 34 and the control grid 38 are both made positive. The flow of current through the primary winding 10—11 is in a direction opposite to the previous energization and accordingly the direct current voltage developed across primary winding 40 and the secondaries of said transformer 41 is such as to render ignitrons 22 and 26 conductive in sequence while maintaining ignitrons 20 and 24 non-conductive. In other words, the direct current voltage developed across the secondary windings 45 and 56 will counter the bias potential of the battery 43 and render screen grids 47 and 58 positive. The thyratrons 30 and 32 will fire when their control grids also become positive at the particular point in their respective half cycle as determined by the setting of the phase shift control device.

The screen grid circuits of the firing valves 29, 30, 31 and 32 have a resistor 65 and a capacitor 66 connected in parallel with the secondary winding of the particular circuit. This capacitor and resistor is required in order to maintain the direct current voltage which is developed across the secondaries when a pulse of current flows through winding 10—11. There are times when the phase shift control device will relay the firing of the ignitrons and during the interval the direct current voltage is maintained since the capacitor 66 upon being charged will discharge through resistor 65 with the time of discharge being selected to more than take care of the maximum delay in firing caused by the phase shift control device.

By the control grids of the thyratrons it is possible to adjust the firing point in relation to the sine wave of the supply voltage and to thus vary the magnitude of the induced secondary current and its heat effect. The present invention provides a phase shift device capable of manual adjustment and which will also automatically shift the firing point of the several ignitrons in order to compensate for variations in line voltage so as to maintain the welding current substantially constant for any particular heat setting as predetermined by the manual adjustment.

Referring to Figure 2, it will be seen that transformer 37, having secondaries 38 and 39, is provided with a primary winding 70. Also transformer 50, having the secondaries 49 and 52, is provided with a primary winding 71 and in a similar manner transformer 62, having secondaries 61 and 64, is provided with the primary winding 72. The said primary windings are connected into the phase shift network by means of potentiometers 73, 74 and 75 and by fixed resistors identified as R3. Each potentiometer is provided with a slider identified by numerals 76, 77 and 78. Three groups of resistors consisting of resistor R and resistor R2 in series are connected as shown in Figure 2 in delta relation to the three phase line. The diagram of Figure 3 illustrates by means of voltage vectors the phase relationship existing across various parts of the network. Vector DE shows the voltage existing across the primary winding 70 of transformer 37 when the sliders of the three potentiometers are in positions D, E and F, respectively. The three sliders are fixed to a common shaft 80 and are connected as shown to the potentiometers 73, 74 and 75 and to the primary windings of the transformers 37, 50 and 62. Upon rotation of the common shaft 80 it will be understood that the sliders all move an equal amount from points D, E and F in a clockwise direction.

The resistors R2 are made of material which has a negligible change in resistance with respect to changes in voltage. However, resistors R are made of material which has a negative resistance characteristic with respect to changes in voltage. The resistors R2 have linear resistance characteristics, whereas, resistors R have nonlinear resistance characteristics. In other words, as the voltage across the resistor R rises, its resistance in ohms becomes less, according to a mathematical relationship which may be determined. As the line voltage increases the current through each pair of resistors R and R2 will also increase, however, the voltage drop across R2 will increase more than the voltage drop across R since the resistance of R has decreased, whereas the resistance of R2 has remained the same. The voltage vectors A—B, B—C, and C—A represent the phase relationship with respect to the line between points A, B and C when resistors R and R2 have the same value at the normal working voltage.

When the voltage on the three-phase alternating current supply line increases it will be understood that the ratio of R to R2 will decrease and the phase relationship between points A—B, B—C and C—A will change to that indicated by the dotted lines connecting points A', B' and C'. The voltage across the primary windings of transformers 37, 50 and 62 indicated by vectors D—E, E—F and F—D in the normal voltage condition, will advance to positions D'—E', E'—F', and F'—D'. The phase of the voltage across the secondaries of each transformer 37, 50 and 62 is accordingly shifted from the previous position so as to delay the firing of the thyratrons controlled by the secondaries respectively. The ignitrons controlled by said thyratrons will therefore fire at a later point in the half cycle of their respective phase and the welding current is accordingly maintained constant instead of rising, which would be the normal result due to the increased line voltage.

Figure 3 shows the phase relationship of the three line voltages and the phase relationship across the primary winding and secondary windings of transformer 37 for conditions existing at normal voltage and at increased line voltage. For a normal voltage as indicated by vector D—E it will be seen that the same is in phase with its line voltage $L_1$—$L_2$. However, due to the increase in the line voltage and the resultant change in the ratio of R to R2, the automatic phase shifting of the voltage D—E is effected so that the same is delayed as indicated by the dotted line D'—E'. The speed with which the voltage compensation may be effected can be predetermined by selecting resistors R having the proper characteristics. If a slow rate of compensation is desired resistors R having a high thermal lag will be used. If rapid compensation is desired resistors R having a low thermal inertia will be used. The resistance-temperature characteristics or resistance-voltage characteristics of the resistors may be selected so as to effect any degree of compensation desired within practical limits.

The phase shift circuit of the invention is capable of manual adjustment in addition to the automatic phase shifting as described which compensates for variations in the voltage of the alternating current supply source. By moving the sliders 76, 77 and 78 in a clockwise direction the firing of the thyratrons can be delayed and said valves can be caused to fire at a predetermined point in the half cycle, depending on the setting of the sliders up to a maximum delay of 120 degrees. With the sliders set as shown in Figure 2 it may be assumed that the thyratrons for phase $L_1$—$L_2$ will fire at time $T_2$, or, in other words, at the instant when the phase shifted voltage D'—E' becomes positive or negative.

With the sliders adjusted as disclosed in Figure 2 it will be understood that the automatic compensation is effective as above described to maintain a constant voltage in the welding current and a substantially constant heat effect. Should the line voltage increase, for example, the voltage D'—E' will be shifted further to delay the firing of the ignitrons and on the other hand, in the event the line voltage should decrease, the resistance of resistors R will increase. This has the effect of changing the resistance ratio of each pair of resistors R and R2 and has the effect of automatically shifting voltage D'—E', for example, so that it is more in phase with its line voltage $L_1$—$L_2$ whereby the ignitrons are fired earlier in the half cycle.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In a control circuit for a power system, an alternating current supply source connected to the input of the system, a load circuit connected to the output of the system, and electric discharge valves interposed between the input and output for controlling the flow of current in the system, the combination therewith of a phase shifting device for shifting the phase of the voltage firing the discharge valves with respect to the voltage of the current supply source, whereby to vary the magnitude of the current in the load circuit, said phase shifting device including a pair of resistance elements connected in series across the alternating current supply source, said elements having dissimilar voltage-resistance characteristics so that the resistance ratio of said elements changes as a result of variations in the voltage of the alternating current supply source, and said phase shifting device operating automatically in response to changes in the resistance ratio of said elements to shift the phase of said voltage firing the discharge valves, to compensate for voltage variations in the current supply source and maintain the current in the load circuit substantially constant for any particular current setting.

2. In a control circuit for a power system, an alternating current supply source connected to the input of the system, a load circuit connected to the output of the system, and electric discharge valves interposed between the input and output for controlling the flow of current in the system, the combination therewith of a phase shifting device for shifting the phase of the voltage firing the discharge valves with respect to the voltage of the current supply source, whereby to vary the magnitude of the current in the load circuit, said phase shifting device including a pair of resistance elements having dissimilar voltage-resistance characteristics and connected in series across the alternating current source, one of said elements having negative resistance characteristics so that the resistance ratio of said elements changes inversely as a result of changes in the voltage of the alternating current supply source, and said phase shifting device operating automatically in response to changes in the resistance ratio of the elements to shift the phase of said voltage firing the discharge valves, to compensate for voltage variations in the current supply source and maintain the current in the load circuit substantially constant for any particular current setting.

3. In a welding system, the combination with a welding transformer having a primary circuit and a secondary load circuit, an alternating current source connected to the primary circuit, electric discharge valves for controlling current flow in the primary circuit, firing valves for controlling the conductivity of said electric discharge valves, a control voltage for triggering said firing valves to render the welding system operative, a phase shift circuit for shifting the phase of the control voltage with respect to the voltage of the current supply source, whereby to shift the firing point of the discharge valves and thus vary the magnitude of the current in the load circuit, means for adjusting said phase shift circuit to select a particular magnitude of current in the load circuit, said phase shift circuit including a pair of resistance elements having dissimilar voltage-resistance characteristics and connected in series across the alternating current supply source, one of said resistance elements having negative resistance characteristics so that the resistance ratio of said elements changes inversely as a result of changes in the voltage of the alternating current supply source, and said phase shift circuit operating automatically in response to changes in the resistance ratio of the elements to shift the firing point of the discharge valves, to compensate for voltage variations in the current supply source and to maintain a substantially constant current in the load circuit for any particular current setting.

4. In a welding system of the character described, the combination with a source of polyphase alternating current, of an inductive device having a secondary winding and primary windings corresponding in number to the phases of the alternating current source, means connecting each primary winding to its respective phase of said source, at least one electric discharge valve for each primary winding for controlling flow of current through the winding, a firing valve of the grid control type for each discharge valve, a control voltage applied to the control grid of the firing valves for triggering the same, a phase shift circuit for shifting the phase of the control voltage with respect to the voltage of each phase of the current supply source, whereby to shift the firing point of the discharge valves for varying the magnitude of the current in the secondary winding, said phase shift circuit comprising in each phase a pair of resistance elements connected in series relation across its respective phase, an inductive winding for each phase also provided by said phase shift circuit and having connection to said resistance elements in a manner to provide a certain phase relation of the voltage across the winding with respect to the voltages of the polyphase source, inductive means in each control grid circuit having inductive relation with one of said inductive windings, whereby adjustment of the phase shift circuit to shift the phase of the voltages across the windings thereof will produce a corresponding shift in the firing point of the discharge valves, at least one resistance element of each pair having negative resistance characteristics as regards changes in the voltage impressed across the terminals of its respective pair whereby to change the resistance ratio of said pair, and said phase shift circuit in response to changes in the resistance ratio of the elements automatically effecting a shift in the firing point of the discharge valves to compensate for variations in the voltage of the alternating current supply source and maintain the current in the secondary winding substantially constant.

5. In a power system including three primary windings connected in delta relation to each other and to a three phase alternating current source, a secondary winding inductively associated with said primary windings, a pair of inversely connected discharge valves for each winding in series with their winding, a firing valve for controlling the conductivity of each discharge valve, said firing valves each having a screen grid and a control grid, means applying control potentials to the screen grids of the firing valves to control the conductive and nonconductive periods of the discharge valves, means applying a control potential to the control grids of the firing valves to control the magnitude of the primary current and thus the magnitude of the current induced in the secondary winding, a phase shift circuit capable of manual adjustment for shifting the phase of the control voltage with respect to the voltage of each phase of the current supply source whereby to shift the firing point of the discharge valves for varying the magnitude of the current in the secondary winding, said phase shift circuit comprising in each phase a pair of resistance elements connected in series relation across its respective phase, an inductive winding for each phase also provided by said phase shift circuit and having connection to said resistance elements in a manner to provide a certain phase relation of the voltage across the winding with respect to the voltages of the polyphase source, inductive means in each control grid circuit having inductive relation with one of said inductive windings, whereby adjustment of the phase shift circuit to shift the phase of the voltages across the windings thereof will produce a corresponding shift in the firing point of the discharge valves, at least one resistance element of each pair having negative resistance characteristics as regards changes in the voltage impressed across the terminals of its respective pair whereby to change the resistance ratio of said pair, and said phase shift circuit in response to changes in the resistance ratio of the elements automatically effecting a shift in the firing point of the discharge valves to compensate for variations in the voltage of the alternating current supply source and maintain the current in the secondary winding substantially constat.

6. In a device of the character described, the combination with a three-phase alternating current source, of a phase shift device including a resistance network comprising a pair of resistance elements for each phase of the source connected across its respective phase, the resistance elements of each pair having dissimilar voltage-resistance characteristics, with one of the elements of each pair having linear resistance characteristics and the other having nonlinear resistance characteristics, so that the resistance ratio of the nonlinear element of each pair to the linear element will change inversely upon change in the voltage impressed across the terminals of the respective pairs, said pairs of resistance elements being connected in delta relation with the linear and nonlinear elements alternating, and a mid-point connection provided by each pair of resistance elements and which is located between the elements of the pair, whereby the phase relation of the voltage across any two of said mid-point connections with respect to the voltages of the respective phases will automatically and proportionally shift in response to changes in the resistance ratio of those elements of the resistance network included in the particular circuit.

JULIUS L. SOLOMON.

No references cited.